United States Patent
Koshimoto et al.

(10) Patent No.: US 10,907,630 B2
(45) Date of Patent: Feb. 2, 2021

(54) RELIEF VALVE DEVICE AND HIGH-PRESSURE PUMP USING SAME

(71) Applicant: DENSO CORPORATION, Kariya (JP)

(72) Inventors: Shinichiro Koshimoto, Kariya (JP); Kaoru Oda, Kariya (JP); Yasuhiro Sawada, Kariya (JP)

(73) Assignee: DENSO CORPORATION, Kariya (JP)

( * ) Notice: Subject to any disclaimer, the term of this patent is extended or adjusted under 35 U.S.C. 154(b) by 262 days.

(21) Appl. No.: 15/775,903

(22) PCT Filed: Nov. 4, 2016

(86) PCT No.: PCT/JP2016/082748
§ 371 (c)(1),
(2) Date: May 14, 2018

(87) PCT Pub. No.: WO2017/094438
PCT Pub. Date: Jun. 8, 2017

(65) Prior Publication Data
US 2018/0328329 A1    Nov. 15, 2018

(30) Foreign Application Priority Data
Dec. 3, 2015  (JP) ................................. 2015-236419

(51) Int. Cl.
*F04B 49/22*      (2006.01)
*F16K 17/06*      (2006.01)
(Continued)

(52) U.S. Cl.
CPC ............ *F04B 49/22* (2013.01); *F16K 15/025* (2013.01); *F16K 15/026* (2013.01); *F16K 17/04* (2013.01);
(Continued)

(58) Field of Classification Search
CPC ...... F02M 55/04; F02M 59/46; F02M 63/005; F02M 63/0042; F04B 49/22;
(Continued)

(56) References Cited

U.S. PATENT DOCUMENTS 4,406,302 A  *  9/1983  Olesen ................ A61M 16/209
                                                     137/514.5
2008/0149204 A1    6/2008  Shimai
(Continued)

FOREIGN PATENT DOCUMENTS

JP         61-223381       10/1986
JP         62-20272         2/1987
(Continued)

*Primary Examiner* — Bryan M Lettman
(74) *Attorney, Agent, or Firm* — Nixon & Vanderhye, P.C.

(57) ABSTRACT

A relief valve, capable of reducing pressure of fuel in a discharge passage and including a valve housing having a communication hole and a valve member provided in a reciprocating manner against the valve housing, where the valve member regulates a flow of the fuel between a discharge passage and a fuel chamber when the valve member is brought into contact with an inner wall formed around the communication hole. T the valve member also allows the flow of the fuel between the discharge passage and the fuel chamber when the valve member is separated from the inner wall. The relief valve further including a spring that biases the valve member such that the valve member and the inner wall are in contact with each other an adjusting pipe and a stopper.

6 Claims, 10 Drawing Sheets

(51) Int. Cl.
    *F16K 15/02*        (2006.01)
    *F16K 17/04*        (2006.01)
(52) U.S. Cl.
    CPC ......... *F16K 17/06* (2013.01); *Y10T 137/7929*
                                                (2015.04)
(58) Field of Classification Search
    CPC ...... F16K 15/026; F16K 15/025; F16K 17/06;
                    F16K 17/04; Y10T 137/7929; Y10T
                                                137/7922
    See application file for complete search history.

(56)            References Cited

U.S. PATENT DOCUMENTS

2011/0315005 A1    12/2011  Oikawa et al.
2013/0032212 A1*    2/2013  Tokuo ................ F02D 41/3845
                                                    137/1
2014/0182451 A1     7/2014  Oikawa et al.

FOREIGN PATENT DOCUMENTS

JP          2004-36624      2/2004
JP          2010-276073    12/2010
JP          2012-229668    11/2012

* cited by examiner

RELIEF VALVE DEVICE AND HIGH-PRESSURE PUMP USING SAME

CROSS REFERENCE TO RELATED APPLICATION

This application is the U.S. national phase of International Application No. PCT/JP2016/082748 filed Nov. 4, 2016 which designated the U.S. and claims priority to Japanese Patent Application No. 2015-236419 filed on Dec. 3, 2015, the entire contents of each of which are incorporated herein by reference.

TECHNICAL FIELD

The present disclosure relates to a relief valve device and a high-pressure pump using the same.

BACKGROUND ART

A conventionally known relief valve device is provided to fluidly connect a first space and a second space in which a fluid having pressure lower than that of fluid in the first space is accumulated, and reduces pressure of the first space by opening the valve when the pressure of the fluid in the first space is equal to or more than the predetermined pressure and transferring the fluid in the first space to the second space. For example, Patent Literature 1 discloses a relief valve device including a valve body having a cylindrical shape and having a communication hole communicated with a first space, a valve member having a pressure receiving surface to which pressure of fluid in the first space is applied, the valve member being housed in the valve body in a reciprocating manner, and a spring that biases the valve member to be in contact with a valve seat formed around the communication hole.

The relief valve device disclosed in Patent Literature 1 includes a biasing-force-adjusting member that can adjust the biasing force of the spring. The biasing-force-adjusting member is formed in a cylindrical shape and fixed in an inside of the valve body, for example, by means of fitting. In the relief valve device disclosed in Patent Literature 1, the biasing-force-adjusting member also has a function of regulating a lift amount of the valve member separated from the valve seat due to the pressure of the fluid in the first space.

However, when a position of the biasing-force-adjusting member against the valve body is adjusted to adapt to variation of the characteristics of the springs, the lift amount of the valve member is varied. Thus, a degree of a pressure reducing in the first space when the valve is opened might be varied or the spring might be damaged because the stroke of the spring becomes unexpectedly large depending on the relief valve device.

Further, for example, in a case where the relief valve device disclosed in Patent Literature 1 is applied to a high-pressure pump for a direct injection engine having high fuel injection pressure, a relief pressure of the relief valve device is set to relatively high. Thus, when the relief valve is opened, the biasing-force-adjusting member might be moved or damaged due to collision of the valve member moving relatively fast by the pressure of the fluid in the first space applied to the pressure receiving surface, with the biasing-force-adjusting member.

PRIOR ART LITERATURES

Patent Literature

Patent Literature 1: JP 5472395 B2

SUMMARY OF INVENTION

It is an object of the present disclosure to provide a relief valve device that opens a valve by predetermined valve opening pressure while reducing variation of a lift amount of a valve member and improving reliability in operating.

According to one aspect of the present disclosure, a relief valve device connected to a first space and a second space that is a different space from the first space and configured to reduce pressure of fluid in the first space, includes a valve body, a valve seat member, a valve member, a biasing member, a biasing-force-adjusting member, and a regulating member. The valve body has an inner space. The valve seat member has a communication hole fluidly connecting the inner space and the first space, and a valve seat formed around the communication hole at a side of the inner space. The valve member is configured to reciprocate against the valve seat member, and regulates a flow of the fluid between the first space and the second space when the valve member is brought into contact with the valve seat and allows the flow of the fluid between the first space and the second space when the valve member is separated from the valve seat. The biasing member biases the valve member such that the valve member and the valve seat are brought into contact with each other. The biasing-force-adjusting member is provided at a side opposite to the valve seat with respect to the valve member to adjust biasing force of the biasing member. The regulating member is formed as a different component from the biasing-force-adjusting member. The regulating member regulates movement of the valve member in the valve opening direction by abutting on the valve member or the valve body when the valve member is moved in a valve opening direction that is a direction away from the valve seat.

In the relief valve device of the present disclosure, the regulating member that regulates the movement of the valve member in the valve opening direction is formed as a different component from the biasing-force-adjusting member. With this, a lift amount of the valve member can be adjusted according to a position of the regulating member. Thus, the lift amount of the valve member can be set precisely compared to a configuration in which the biasing-force-adjusting member has both of two functions of adjusting the biasing force of the biasing member and regulating the lift amount of the valve member. Accordingly, variation of the lift amount of the valve member can be reduced and reliability in operation can be improved.

Since the biasing-force-adjusting member has only the function of adjusting the biasing force of the biasing member, the biasing force of the biasing member can be adjusted precisely. Further, since the biasing-force-adjusting member is not contacted with the valve member moving in the valve opening direction, the biasing-force-adjusting member can be prevented from being moved or damaged due to the contact with the valve member. With this, the biasing force of the biasing member can be prevented from being changed from initially set biasing force, and thus the valve can be opened at predetermined valve opening pressure.

EMBODIMENTS FOR CARRYING OUT INVENTION

Hereinafter, a plurality of embodiments of the present disclosure is described with reference to drawings. The same reference sign is assigned to a substantially same component in the embodiments, and therefore the description thereof is omitted.

First Embodiment

A relief valve 1 as "a relief valve device" according to a first embodiment of the present disclosure is described with reference to FIG. 1 and FIG. 2.

Figure 2:
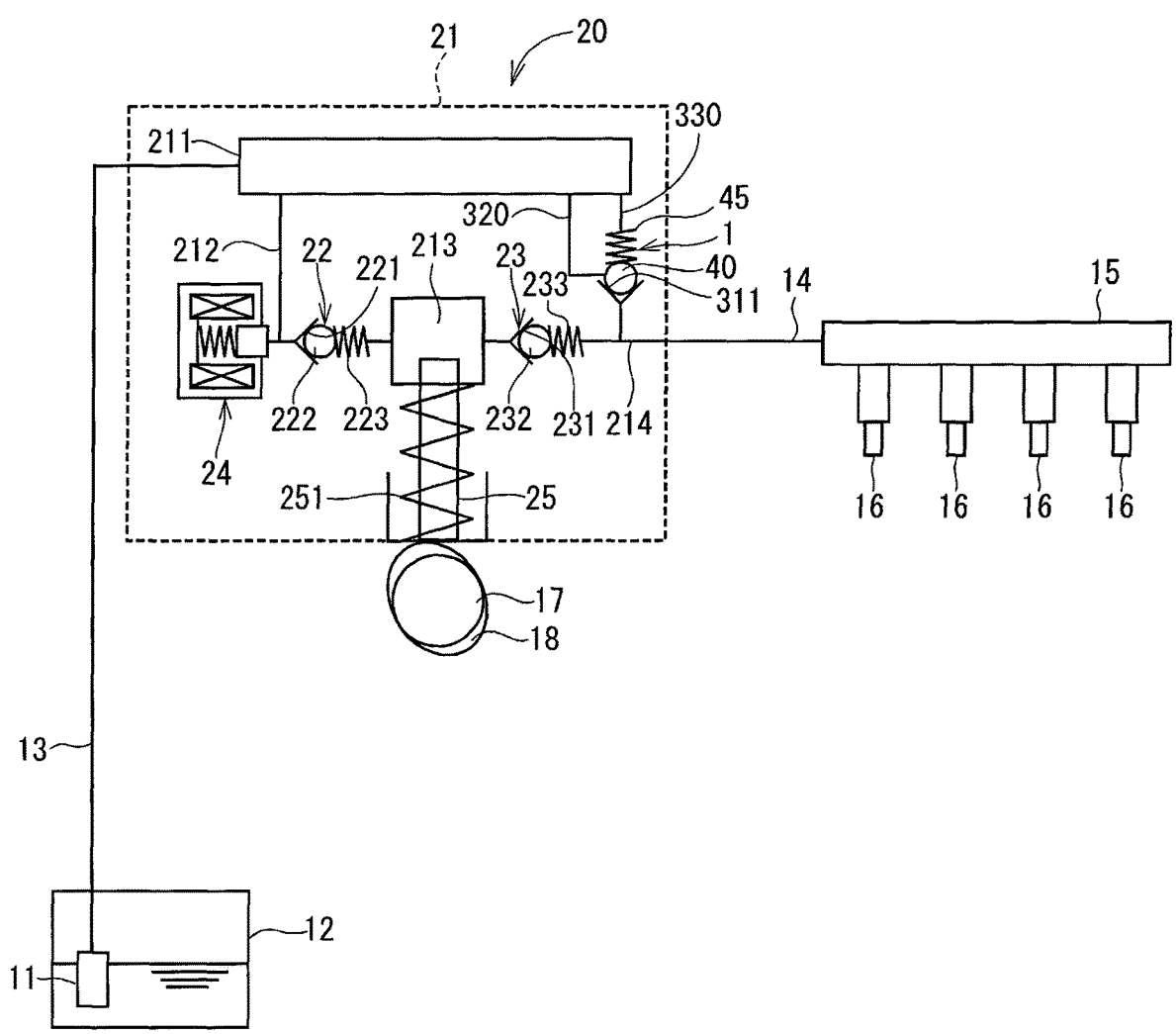
FIG. 2 is schematic view of a fuel supply system using a high-pressure pump including the relief valve device according to the first embodiment of the present disclosure.

As shown in FIG. 2, the relief valve 1 is provided in a high-pressure pump 20. The high-pressure pump 20 is provided in a vehicle not shown. For example, the vehicle can travel by an internal combustion engine as a driving source using gasoline as fuel.

A fuel pump 11 pumps up fuel stored in a fuel tank 12 so as to supply the fuel to the high-pressure pump 20 through a pipe 13. The high-pressure pump 20 pressurizes and discharges the fuel supplied from the fuel pump 11 so as to supply the fuel to a fuel rail 15 through a pipe 14. The high-pressure fuel stored in the fuel rail 15 is supplied to the internal combustion engine of the vehicle through a plurality of injectors 16 connected to the fuel rail 15.

The high-pressure pump 20 includes a pump housing 21 served as "a housing", a suction valve 22, a discharge valve 23, a driving portion 24, a plunger 25, the relief valve 1, and the like.

Figure 3:
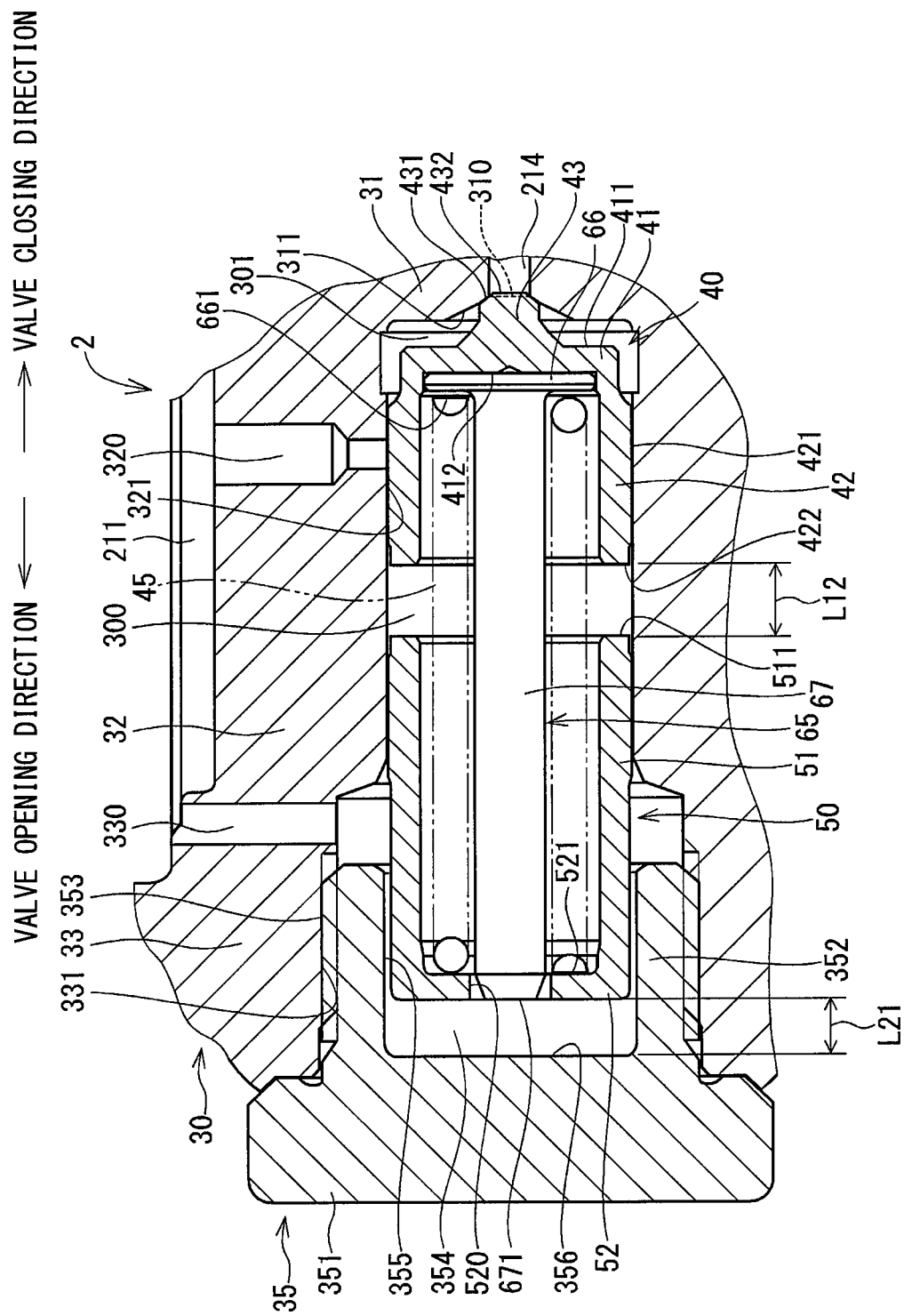
FIG. 3 is a cross-sectional view of a relief valve device according to a second embodiment of the present disclosure.

The pump housing 21 is formed of, for example, metal such as stainless steel. As shown in FIG. 3, the pump housing 21 includes a fuel chamber 211 served as "a second space", a suction passage 212, a pressurizing chamber 213, a discharge passage 214 served as "a first space", and the like. The fuel chamber 211 is formed so that the pipe 13 and the suction passage 212 communicate with each other. The suction passage 212 is formed to communicate with the pressurizing chamber 213. The pressurizing chamber 213 is formed to communicate with the discharge passage 214. The discharge passage 214 is formed to communicate with the pipe 14. In the pump housing 21, the fuel in the pipe 13 flows into the pipe 14 through the fuel chamber 211, the suction passage 212, the pressurizing chamber 213, and the discharge passage 214.

As shown in FIG. 2, the suction valve 22 is provided between the suction passage 212 and the pressurizing chamber 213. The suction valve 22 includes a valve seat 221, a valve member 222, a biasing member 223, and the like. The valve seat 221 is formed on an inner wall of the suction passage 212 at a side of the pressurizing chamber 213. The valve member 222 is formed to be in contact with the valve seat 221 from a side of the pressurizing chamber 213. The biasing member 223 is formed to bias the valve member 222 toward the valve seat 221. When the valve member 222 is separated from the valve seat 221, a flow of the fuel between the suction passage 212 and the pressurizing chamber 213 is allowed. When the valve member 222 is brought into contact with the valve seat 221, the flow of the fuel between the suction passage 212 and the pressurizing chamber 213 is interrupted.

The discharge valve 23 is provided between the pressurizing chamber 213 and the discharge passage 214. The discharge valve 23 includes a valve seat 231, a valve member 232, and a biasing member 233. The valve seat 231 is formed on an inner wall of the pressurizing chamber 213 at a side of the discharge passage 214. The valve member 232 is formed to be in contact with the valve seat 231 from a side of the discharge passage 214. The biasing member 233 is formed to bias the valve member 232 toward the valve seat 231. When the valve member 232 is separated from the valve seat 231, a flow of the fuel between the pressurizing chamber 213 and the discharge passage 214 is allowed. When the valve member 232 is brought into contact with the valve seat 231, the flow of the fuel between the pressurizing chamber 213 and the discharge passage 214 is interrupted. That is, the discharge valve 23 is served as a check valve that allows the flow of the fuel from the pressurizing chamber 213 toward the discharge passage 214 and interrupts the flow of the fuel from the discharge passage 214 toward the pressurizing chamber 213.

The driving portion 24 is provided to be connected to the valve member 222. When electric power is supplied, the driving portion 24 can drive to move the valve member 222 toward the valve seat 221 or the pressurizing chamber 213. When the electric power is not supplied, the driving portion 24 biases the valve member 222 toward the pressurizing chamber 213 against the biasing force of the biasing member 223. With this, the valve member 222 is separated from the valve seat 221, and then the suction valve 22 is set in a valve opened state. On the other hand, when the electric power is supplied, the driving portion 24 drives such that biasing force biasing the valve member 222 toward the pressurizing chamber 213 becomes small. With this, the valve member 222 is moved toward the valve seat 221 to be in contact with the valve seat 221 by the biasing force of the biasing member 223, and then the suction valve 22 is set in a valve closed state. In this way, the suction valve 22 is served as a normally open type valve device by a combination with the driving portion 24.

The plunger 25 is formed as a bar-like member formed of, for example, metal such as stainless steel. One end of the plunger 25 is inserted into an inside of a cylinder formed in the pump housing 21 such that the plunger 25 is connected to the pressurizing chamber 213. An outer wall of the plunger 25 is slidable on an inner wall of the cylinder and the plunger 25 is supported in a reciprocating manner in an axial direction by the inner wall of the cylinder. When the plunger 25 is reciprocated in the axial direction, a volume of the pressurizing chamber 213 is changed.

The relief valve 1 is provided between the discharge passage 214 and the fuel chamber 211. When the pressure of the fuel in the discharge passage 214 becomes equal to or more than valve opening pressure as relief pressure, the relief valve 1 is opened and the fuel in the discharge passage 214 is returned to the fuel chamber 211. A detailed configuration of the relief valve 1 is described below.

In the high-pressure pump 20, the other end of the plunger 25 is in contact with a cam 18 formed on a cam shaft 17 of the internal combustion engine of the vehicle. The high-pressure pump 20 includes a spring 251 that biases the plunger 25 toward the cam 18. When the internal combustion engine is driven, the cam shaft 17 and the cam 18 are rotated in synchronization with a crank shaft, and then the plunger 25 is reciprocated in the axial direction.

When the plunger 25 is moved toward the cam 18 in a state in which the suction valve 22 is opened, the volume of the pressurizing chamber 213 is increased, and then the fuel in the suction passage 212 is suctioned into the pressurizing chamber 213. Further, when the plunger 25 is moved to a side opposite to the cam 18 in a state in which the suction valve 22 is opened, the volume of the pressurizing chamber 213 is decreased, and then the fuel in the pressurizing chamber 213 is returned to the suction passage 212.

On the other hand, when the plunger 25 is moved to a side opposite to the cam 18 in a state in which the suction valve 22 is closed, the volume of the pressurizing chamber 213 is decreased, and then the fuel in the pressurizing chamber 213 is compressed and pressurized. When the pressure of the fuel in the pressurizing chamber 213 becomes equal to or more than the valve opening pressure of the discharge valve 23, the discharge valve 23 is opened and then the fuel is discharged from the pressurizing chamber 213 to the discharge passage 214.

The pipe 14 to be connected to the fuel rail 15 is connected to the pump housing 21 so as to be connected to the discharge passage 214. The fuel pressurized in the pressurizing chamber 213 is supplied to the fuel rail 15 through the discharge passage 214 and the pipe 14. With this, the high-pressure fuel is accumulated in the fuel rail 15.

Next, a configuration of the relief valve 1 is described in detail with reference to FIG. 1.

The relief valve 1 includes a valve housing 30, a valve member 40, a spring 45 served as "a biasing member", an adjusting pipe 50 served as "a biasing-force-adjusting member", a stopper 60 served as "a regulating member", and the like. In FIG. 1, a direction in which an inclined surface 431 of the valve member 40 is moved to be in contact with an inner wall 311 of the valve housing 30 served as "a valve seat" is defined as "a valve closing direction", and a direction in which the inclined surface 431 is moved away from the inner wall 311 is defined as "a valve opening direction".

The valve housing 30 is formed of, for example, metal such as stainless steel. The valve housing 30 is formed by a valve seat portion 31 served as "a valve seat member", a first cylinder 32, a second cylinder 33, a plug 34 served as "a second valve body", and the like. In the present embodiment, the valve seat portion 31, the first cylinder 32, and the second cylinder 33 are integrally formed with the pump housing 21 of the high-pressure pump 20 into a cylindrical shape having a bottom. The first cylinder 32, the second cylinder 33, and the plug 34 correspond to "a valve body". The first cylinder 32 and the second cylinder 33 correspond to "a first valve body".

The valve seat portion 31 is provided at a side opposite to the second cylinder 33 with respect to the first cylinder 32 forming an inner space 300 of the valve housing 30.

The valve seat portion 31 has a communication hole 310 communicating with the discharge passage 214. The inner wall 311 of the valve seat portion 31 forming the communication hole 310, at a side opposite to the discharge passage 214 is formed such that an inner diameter is increased from a side of the discharge passage 214 toward the inner space 300.

The first cylinder 32 is formed in a substantially cylindrical shape that houses the valve member 40 in a reciprocating manner. The first cylinder 32 is formed such that an inner wall 321 is slidable on an outer wall 421 at an outer side in a radial direction of the valve member 40. The first cylinder 32 has a communication passage 320 fluidly connecting the inner space 300 and the fuel chamber 211, at a portion of the inner wall 321 on which the valve member 40 is slidable. The adjusting pipe 50 is fitted into an inside of the first cylinder 32 at a side opposite to the valve seat portion 31.

The second cylinder 33 is formed in a cylindrical shape and provided at a side opposite to the valve seat portion 31 with respect to the first cylinder 32. The second cylinder 33 is formed such that an inner diameter of the second cylinder 33 is larger than that of the first cylinder 32. A screw groove is formed on an inner wall 331 of the second cylinder 33. The second cylinder 33 includes a communication passage 330 fluidly connecting the inner space 300 and the fuel chamber 211, at a side of the first cylinder 32. The communication passage 330 is separated from the communication passage 320.

The plug 34 forms the inner space 300 together with the valve seat portion 31, the first cylinder 32, and the second cylinder 33. The plug 34 includes a body 341, a small inner diameter portion 342, a large inner diameter portion 343, and the like. The body 341, the small inner diameter portion 342, and the large inner diameter portion 343 are formed integrally.

The body 341 is formed in a columnar shape having a substantially hexagonal section. The body 341 is provided to close an opening of the second cylinder 33 at a side opposite to the first cylinder 32.

The small inner diameter portion 342 is formed in a substantially cylindrical shape and is provided at a side of the inner wall 311 with respect to the body 341. The small inner diameter portion 342 includes a stopper insertion space 344 into which end of the stopper 60 can be inserted.

The large inner diameter portion 343 is formed in a substantially cylindrical shape and is provided at a side of the inner wall 311 with respect to the small inner diameter portion 342. The large inner diameter portion 343 is formed such that an outer diameter of the large inner diameter portion is substantially equal to an inner diameter of the second cylinder 33. A screw groove is formed on an outer wall 345 of the large inner diameter portion 343. The screw groove can engage with the screw groove formed on the inner wall 331 of the second cylinder 33. With this, the plug 34 is joined to the second cylinder 33 by the screw. The large inner diameter portion 343 has a pipe insertion space 346 into which an end of the adjusting pipe 50 can be inserted, at an inner side of the large inner diameter portion 343. The pipe insertion space 346 fluidly connects the stopper insertion space 344 and the inner space 300 with each other at a side of the inner wall 311 with respect to the plug 34.

The valve member 40 is formed in a cylindrical shape having a bottom and is formed of, for example, metal such as stainless steel. The valve member 40 is housed in the first cylinder 32 in a reciprocating manner. The valve member 40 is formed by a bottom 41, a slide portion 42, a seal 43, and the like.

The bottom 41 is formed in a circular plate shape substantially orthogonal to a direction in which the valve member 40 is reciprocated, namely a direction of a center axis CA1 of the relief valve 1. The bottom 41 is formed such that an outer diameter of the bottom 41 is smaller than an inner diameter of the first cylinder 32. The seal 43 is provided on one surface 411 of the bottom 41. When the relief valve 1 is opened, the one surface 411 is served as a pressure receiving surface to which the pressure of the fluid in the discharge passage 214 is applied. One end of the spring 45 is in contact with a surface 412 of the bottom 41.

The slide portion 42 is formed in a substantially cylindrical shape and is provided at a side of the surface 412 of the bottom 41. In the slide portion 42, an outer wall 421 at an outer side in the radial direction is slidable on the inner wall 321 of the first cylinder 32. With this, a reciprocating movement of the valve member 40 is guided by the valve housing 30.

The seal 43 is provided at a side of the one surface 411 of the bottom 41. The seal 43 is formed to protrude from the one surface 411 toward the valve seat portion 31. The seal 43 includes an inclined surface 431 inclined against the center axis CA1 at a corner part of a distal end opposite to the bottom 41.

The inclined surface 431 is formed to be in contact with the inner wall 311 of the valve seat portion 31. When the inclined surface 431 and the inner wall 311 are brought into contact with each other, the flow of the fuel between the discharge passage 214 and the inner space 300 is interrupted. When the inclined surface 431 and the inner wall 311 are separated from each other, the flow of the fuel between the discharge passage 214 and the inner space 300 is allowed. When the relief valve 1 is closed, a distal end surface 432 at a side of the valve seat portion 31 is served as a pressure receiving surface to which the pressure of the fluid in the discharge passage 214 is applied.

The spring 45 is formed by, for example, a coil spring. The spring 45 is housed in the valve member 40 and the adjusting pipe 50. One end of the spring 45 is in contact with the surface 412 of the valve member 40 and the other end of the spring 45 is in contact with the adjusting pipe 50. The spring 45 biases the valve member 40 such that the inclined surface 431 and the inner wall 311 are in contact with each other.

The adjusting pipe 50 is formed in a cylindrical shape having a bottom and is formed of, for example, metal such as stainless steel. The adjusting pipe 50 is provided at a side opposite to the communication hole 310 with respect to the valve member 40. The adjusting pipe 50 includes a cylinder 51, a bottom 52, and the like. The cylinder 51 and the bottom 52 are formed integrally.

The cylinder 51 is formed in a cylindrical shape such that an outer diameter of the cylinder 51 is equal to or slightly larger than the inner diameter of the first cylinder 32. The cylinder 51 has an opening at a side of the valve member 40 and an opening at a side opposite to the valve member 40. The cylinder 51 is fixed to an inside of the first cylinder 32 by means of, for example, welding or fitting.

The bottom 52 is provided to close the opening of the cylinder 51 at a side opposite to the valve member 40. The bottom 52 and a part of the cylinder 51 are inserted into the pipe insertion space 346 of the plug 34. At this time, a gap is generated between the bottom 52 and a part of the cylinder 51 and the plug 34. The bottom 52 has a hole 520 fluidly connecting an inside and an outside of the cylinder 51 with each other, at a center of the bottom 52. The other end of the spring 45 is in contact with a bottom surface 521 of the bottom 52 at a side of the valve member 40. With this, when a fixed position of the adjusting pipe 50 against the first cylinder 32 is changed, the biasing force of the spring 45 is adjusted.

The stopper 60 is formed in the valve housing 30 so as to extend in a direction from a side of the plug 34 toward the valve member 40. The stopper 60 is formed as a different component from the adjusting pipe 50. The stopper 60 includes a fixing portion 61 served as "a body side fixing portion", a rod portion 62 served as "a body side contact portion", and the like. The fixing portion 61 and the rod portion 62 are formed integrally.

The fixing portion 61 is formed in a substantially cylindrical shape. The fixing portion 61 is fitted and fixed in the stopper insertion space 344 of the plug 34.

The rod portion 62 is formed on an end surface 611 of the fixing portion 61 at a side of the valve member 40. The rod portion 62 is a substantial bar-shaped member extending in a direction from the fixing portion 61 toward the valve member 40. The rod portion 62 is formed such that an outer diameter of the rod portion 62 is smaller than an outer diameter of the fixing portion 61. The rod portion 62 is inserted into the hole 520 of the adjusting pipe 50. An end surface 621 of the rod portion 62 at a side of the inner wall 311 is located adjacent to the surface 412 of the valve member 40.

Specifically, when the inclined surface 431 of the seal 43 and the inner wall 311 of the valve seat portion 31 are in contact with each other, a distance L11 between the end surface 621 and the surface 412 of the valve member 40 is shorter than a distance L12 between the end surface 422 of the valve member 40 at a side of the adjusting pipe 50 and the end surface 511 of the adjusting pipe 50 at a side of the valve member 40. An edge portion 303 is defined by an edge portion of the inner wall 321 at a side of the inner wall 311. The inner wall 321 forms the opening 302 of the communication passage 320 at a side of the inner space 300. An edge portion 401 is defined by an edge portion of the outer wall 421 of the valve member 40 at a side of the inner wall 311, the outer wall sliding on the inner wall 321. In this case, the distance L11 is longer than a distance L13 between the edge portion 303 and the edge portion 401 when the inner wall 311 and the inclined surface 431 are in contact with each other.

Next, operation of the high-pressure pump 20 according to the present embodiment is described with reference to FIG. 2.

[Suction Process]

When the supply of electric power to the driving portion 24 is interrupted, the valve member 222 of the suction valve 22 is biased toward the pressurizing chamber 213 by the driving portion 24. With this, the valve member 222 is separated from the valve seat 221, and therefore the suction valve 22 is opened. In this state, when the plunger 25 is moved toward the cam 18, the volume of the pressurizing chamber 213 is increased, and the fuel in the suction passage 212 is suctioned into the pressurizing chamber 213.

[Amount Adjusting Process]

When the plunger 25 is moved to a side opposite to the cam 18 in a state in which the suction valve 22 is opened, the volume of the pressurizing chamber 213 is decreased, and the fuel in the pressurizing chamber 213 is returned to the suction passage 212. In the middle of the amount adjusting process, when the electric power is supplied to the driving portion 24, the suction valve 22 is closed. An amount of the fuel returned from the pressurizing chamber 213 to the suction passage 212 is adjusted by the timing of closing the suction valve 22, and then the amount of the fuel pressurized in the pressurizing chamber 213 is determined.

[Pressurizing Process]

When the plunger 25 is moved to a side opposite to the cam 18 in a state in which the suction valve 22 is closed, the volume of the pressurizing chamber 213 is decreased, and the fuel in the pressurizing chamber 213 is pressurized. When the pressure of the fuel in the pressurizing chamber 213 becomes equal to or more than the valve opening pressure of the discharge valve 23, the discharge valve 23 is opened, and then the fuel is discharged from the pressurizing chamber 213 to the discharge passage 214.

When the supply of the electric power to the driving portion 24 is interrupted and the plunger 25 is moved toward the cam 18, the suction valve 22 is opened again. With this, the pressurizing process in which the fuel is pressurized is terminated, and the suction process in which the fuel is suctioned from the suction passage 212 to the pressurizing chamber 213 is started again.

By repeating [the suction process], [the amount adjusting process], and [the pressurizing process] described above, the high-pressure pump 20 pressurizes and discharges the fuel suctioned from the fuel tank 12 and supplies the fuel to the fuel rail 15. The supply amount of the fuel from the high-pressure pump 20 to the fuel rail 15 is adjusted by controlling the supply timing of the electric power to the driving portion 24, or the like.

For example, when the reciprocating movement of the plunger 25 is continued for a predetermined period of time in a state in which the supply of the electric power to the driving portion 24 is interrupted, the fuel is not pressurized in the pressurizing chamber 213 and the fuel is not supplied from the high-pressure pump 20 to the fuel rail 15 because the valve opened state of the suction valve 22 is kept. Further, in a case in which the valve opened state of the suction valve 22 is kept for some reason such as adhering of the valve member 222, the fuel is not pressurized in the pressurizing chamber 213 and the fuel is not supplied from the high-pressure pump 20 to the fuel rail 15. Further, in a case in which the valve closed state of the suction valve 22 is kept for some reason such as adhering of the valve member 222, the fuel is not pressurized and the fuel is not supplied from the high-pressure pump 20 to the fuel rail 15 because the fuel is not suctioned to the pressurizing chamber 213.

On the other hand, for example, when the supply of the electric power to the driving portion 24 is continued for a predetermined period of time, the fuel is pressurized in the pressurizing chamber 213 and supplied from the high-pressure pump 20 to the fuel rail 15 because the valve closed state of the suction valve 22 is kept, and then the pressure of the fuel in the discharge passage 214, the pipe 14, and the fuel rail 15 is increased. Further, when the valve member 222 of the suction valve 22 is driven in association with the pressure in the pressurizing chamber 213 due to continuous energizing or failure of the driving portion, the pressurizing is continued.

Next, operation of the relief valve 1 according to the present embodiment is described with reference to FIG. 1.

When the pressure of the fuel in the discharge passage 214 becomes equal to or more than the valve opened pressure, the inclined surface 431 is separated from the inner wall 311. When the inclined surface 431 is separated from the inner wall 311, the fuel in the discharge passage 214 flows into an intermediate chamber 301 of the inner space 300 formed by the valve seat portion 31, the first cylinder 32, and the bottom 41 through the communication hole 310, and then the pressure of the fuel in the intermediate chamber 301 is increased. With this, the valve member 40 is moved in a direction away from the valve seat portion 31.

When the valve member 40 is further moved in the direction away from the valve seat portion 31, the intermediate chamber 301 and the communication passage 320 are communicated with each other. With this, the fuel in the intermediate chamber 301 flows to the fuel chamber 211 through the communication passage 320. At this time, the valve member 40 moved in the direction away from the valve seat portion 31 is brought into contact with an end surface 621 of the stopper 60, and the movement of the valve member 40 in the direction away from the valve seat portion 31 is regulated. At this time, the valve member 40 and the adjusting pipe 50 are still separated from each other.

Further, the fuel flowing into a side of the plug 34 of the valve member 40 from the intermediate chamber 301 through a space between the outer wall 421 of the valve member 40 and the inner wall 321 of the first cylinder 32 flows to the fuel chamber 211 through the communication passage 330.

When the pressure of the fuel in the intermediate chamber 301 is reduced, the valve member 40 is moved toward the valve seat portion 31 by the biasing force of the spring 45. When the valve member 40 is moved in the valve closing direction, the intermediate chamber 301 and the communication passage 320 are interrupted, and the inclined surface 431 and the inner wall 311 are brought into contact with each other. Accordingly, the relief valve 1 is closed.

(a) In the relief valve 1, the stopper 60 that regulates the movement of the valve member 40 in the valve opening direction by abutting on the valve member 40 when the valve member 40 is moved in the valve opening direction is formed as a different component from the adjusting pipe 50. With this, the lift amount of the valve member 40 can be adjusted according to the position of the stopper 60 against the valve housing 30, and therefore the lift amount of the valve member 40 can be set precisely regardless of the adjusting of the biasing force of the spring 45. Accordingly, in the relief valve 1, variation of the lift amount of the valve member 40 can be reduced, and reliability in operating can be improved.

(b) In the relief valve 1, the adjusting pipe 50 has a function of adjusting the biasing force of the spring 45, and then the biasing force of the spring 45 can be adjusted precisely.

Figure 1:
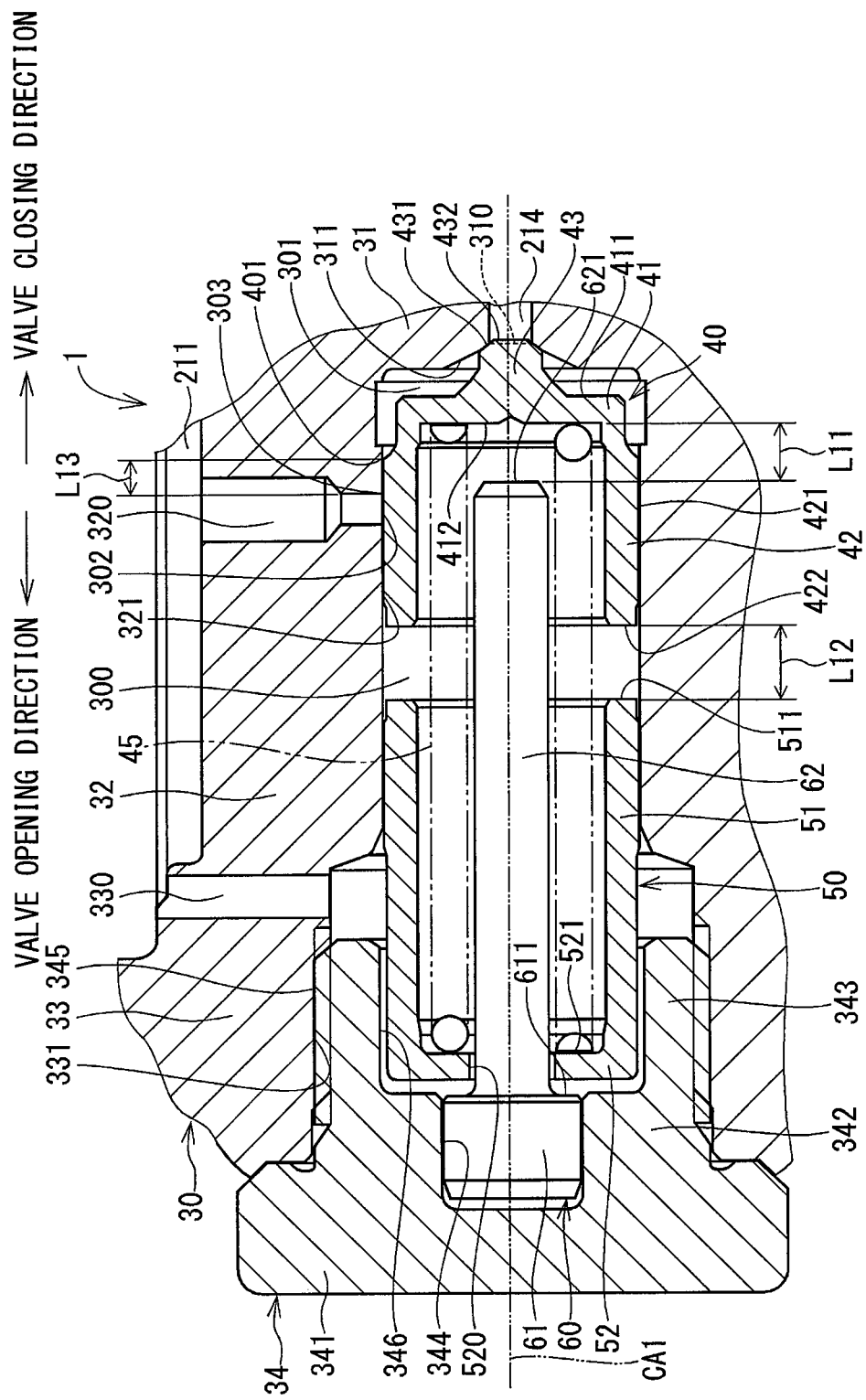
FIG. 1 is a cross-sectional view of a relief valve device according to a first embodiment of the present disclosure.

(c) In the relief valve 1, as shown in FIG. 1, when the inclined surface 431 is in contact with the inner wall 331, the distance L11 is shorter than the distance L12. With this, when the relief valve 1 is opened, the valve member 40 and the adjusting pipe 50 are not in contact with each other. Consequently, the adjusting pipe 50 can be prevented from being moved or damaged due to the contact between the valve member 40 and the adjusting pipe 50. Accordingly, the biasing force of the spring 45 can be prevented from being changed from initially set biasing force, and then the valve can be opened at predetermined valve opening pressure.

(d) In the relief valve 1, the stopper 60 is fixed to the plug 34 joined to the second cylinder 33 by the screw. With this, by adjusting the position of the screw joining between the plug 34 and the second cylinder 33, the distance L11 between the end surface 621 and the surface 412 can be adjusted. Accordingly, the variation of the lift amount of the valve member 40 can be further reduced.

Second Embodiment

A relief valve device according to a second embodiment of the present disclosure is described with reference to FIG. 3. In the second embodiment, a valve housing and a stopper are different from those in the first embodiment.

A relief valve 2 served as "a relief valve device" includes a valve housing 30, a valve member 40, a spring 45, an adjusting pipe 50, a stopper 65 served as "a regulating member", and the like. In FIG. 3, a direction in which an inclined surface 431 of the valve member 40 is moved to be in contact with an inner wall 311 of the valve housing 30 is defined as "a valve closing direction", and a direction in which the inclined surface 431 is moved away from the inner wall 311 is defined as "a valve opening direction".

The valve housing 30 is formed by a valve seat portion 31, a first cylinder 32, a second cylinder 33, a plug 35 served as "a second valve body", and the like.

The plug 35 is provided in an opening of the second cylinder 33 at a side opposite to the first cylinder 32. The plug 35 forms an inner space 300 together with the valve seat portion 31, the first cylinder 32, and the second cylinder 33. The plug 35 includes a body 351, a cylinder 352, and the like. The body 351 and the cylinder 352 are formed integrally.

The body 351 is formed in a substantially circular plate shape. The body 351 is formed to close the opening of the second cylinder 33 at a side opposite to the first cylinder 32.

The cylinder 352 is formed in a substantially cylindrical shape and is provided at a side of the inner wall 311 with respect to the body 351. The cylinder 352 is formed such that an outer diameter of the cylinder 352 is substantially equal to an inner diameter of the second cylinder 33. A screw groove is formed on an outer wall 353 of the cylinder 352. The screw groove can engage with the screw groove formed on the inner wall 331 of the second cylinder 33. With this, the plug 35 is joined to the second cylinder 33 by the screw. The cylinder 352 has a pipe insertion space 354 into which an end of the adjusting pipe 50 can be inserted, at an inner side of the cylinder 352. A gap is formed between a bottom surface 356 served as "an inner wall of the valve body at a side opposite to the communication hole" of the body 351 and the inner wall 355 of the cylinder 352 that form the pipe insertion space 354, and an outer wall of the adjusting pipe 50.

The stopper 65 is formed to extend from a side of the valve member 40 toward the plug 34. The stopper 65 is provided as a different component from the valve member 40 and the adjusting pipe 50. The stopper 65 includes a fixing portion 66 served as "a valve member side fixing portion", a rod portion 67 served as "a valve member side contact portion", and the like. The fixing portion 66 and the rod portion 67 are formed integrally.

The fixing portion 66 is formed in a circular plate shape. The fixing portion 66 is in contact with a surface 412 of the valve member 40. One end of the spring 45 is in contact with an end surface 661 of the fixing portion 66 at a side opposite to a portion contacted with the surface 412. That is, the fixing portion 66 is interposed between the bottom 41 of the valve member 40 and the spring 45.

The rod portion 67 is provided on the end surface 661 of the fixing portion 66. The rod portion 67 is a substantially bar-shaped member extending from the fixing portion 66 toward the plug 35. The rod portion 67 is formed such that an outer diameter of the rod portion 67 is smaller than an outer diameter of the fixing portion 66. The rod portion 67 can be inserted into a hole 520 of the adjusting pipe 50. An end surface 671 of the rod portion 67 at a side of the plug 35 is located adjacent to the bottom surface 356.

Specifically, when the inclined surface 431 of a seal 43 and the inner wall 311 of the valve seat portion 31 are in contact with each other, a distance L21 between the end surface 671 and the bottom surface 356 is shorter than a distance L12 between an end surface 422 of the valve member 40 and an end surface 511 of the adjusting pipe 50. With this, when the valve member 40 is moved in the valve opening direction, the stopper 65 and the plug 35 are brought into contact with each other, and then the valve member 40 and the adjusting pipe 50 are kept to be separated from each other.

In the relief valve 2, the stopper 65 that regulates the movement of the valve member 40 in the valve opening direction by abutting on the plug 35 when the valve member 40 is moved in the valve opening direction is formed as a different component from the adjusting pipe 50. With this, the relief valve 2 has the effects (a) to (c) described in the first embodiment.

Further, the plug 35 is joined to the second cylinder 33 by the screw, and the gap is formed between the plug 35 and the adjusting pipe 50. With this, the distance L21 can be adjusted without affecting the adjusting of the biasing force of the spring 45. Accordingly, the relief valve 2 has the effect (d) described in the first embodiment.

Third Embodiment

A relief valve device according to a third embodiment of the present disclosure is described with reference to FIG. 4. In the third embodiment, a regulating member is different from that in the first embodiment.

A relief valve 3 served as "a relief valve device" includes a valve housing 30 having a plug 35, a valve member 40, a spring 45, an adjusting pipe 50, a stopper 70 served as "a regulating member", and the like. In FIG. 4, a direction in which an inclined surface 431 of the valve member 40 is moved to be in contact with an inner wall 311 of the valve housing 30 is defined as "a valve closing direction", and a direction in which the inclined surface 431 is moved away from the inner wall 311 is defined as "a valve opening direction".

The stopper 70 is provided on an outer wall 421 at an outer side in a radial direction of a slide portion 42. Specifically, the stopper 70 is fitted to an inner side groove 423 formed on the outer wall 421. The stopper 70 is formed in a substantially C-shape and has biasing force to be expanded to the outer side in the radial direction.

An outer side groove 322 is formed at a position of a first cylinder 32 corresponding to the stopper 70. An end at an outer side in a radial direction of the stopper 70 is housed in the outer side groove 322 so as to be reciprocated in a direction of a center axis CA3 of the relief valve 3.

An inner wall 323 at a side of an inner wall 311, among inner walls that form the outer side groove 322 is arranged at a position so as not to be in contact with an end surface 701 of the stopper 70 at a side of the inner wall 311 when the inner wall 311 and the inclined surface 431 are in contact with each other. An inner wall 324 at a side opposite to the inner wall 311, among the inner walls that form the outer side groove 322 is arranged at a position so as to form a gap between an end surface 422 of the valve member 40 and an end surface 511 of the adjusting pipe 50 when an end surface 702 of the stopper 70 at a side opposite to the inner wall 311 and the inner wall 324 are brought into contact with each other.

Figure 4:
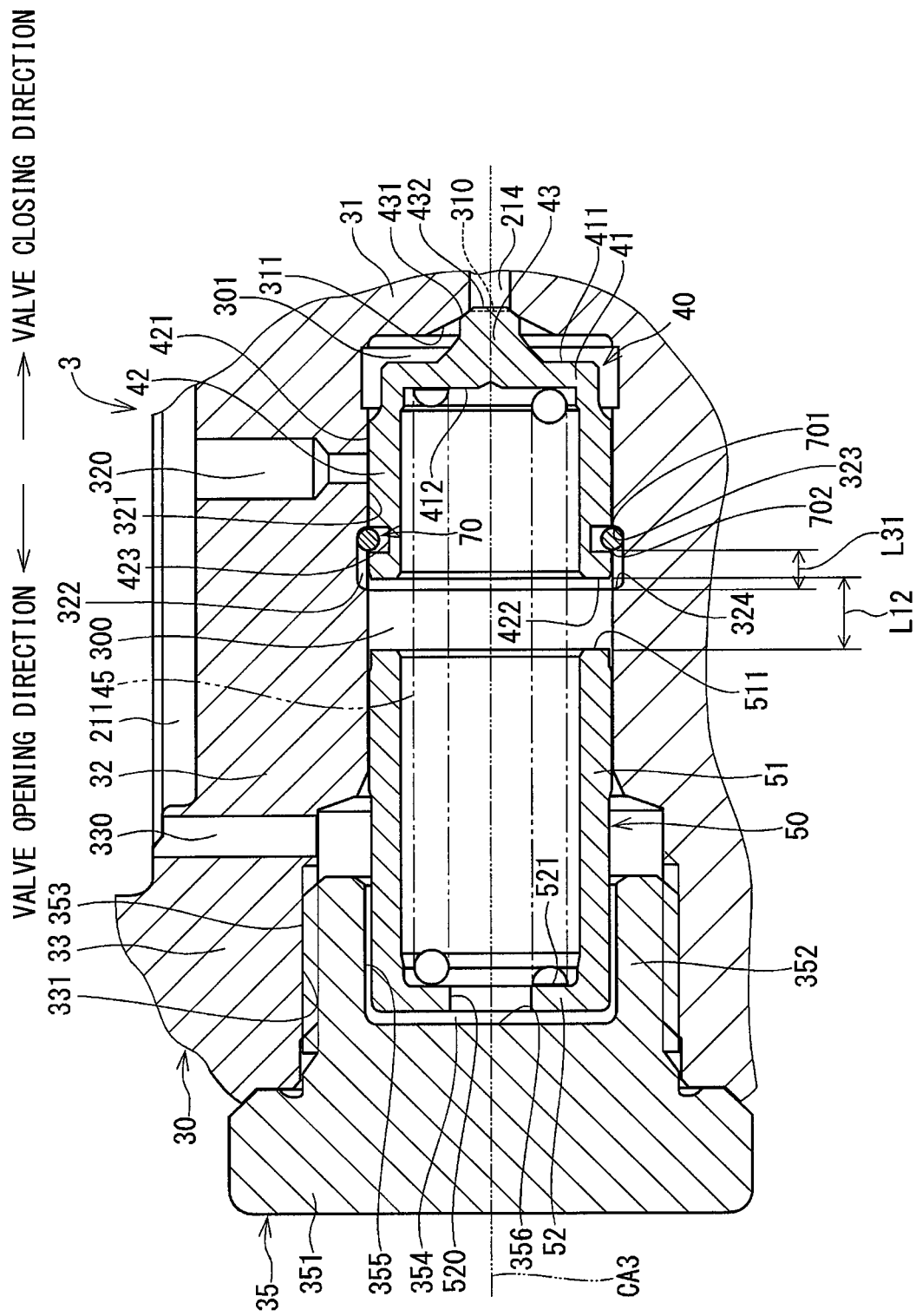
FIG. 4 is a cross-sectional view of a relief valve device according to a third embodiment of the present disclosure.

In the present embodiment, as shown in FIG. 4, when the inclined surface 431 of a seal 43 and the inner wall 311 of a valve seat portion 31 are in contact with each other, the end surface 701 of the stopper 70 and the inner wall 323 are in contact with each other. At this time, a distance L31 between the end surface 702 of the stopper 70 and the inner wall 324 of the outer side groove 322 is shorter than a distance L12 between an end surface 422 of the valve member 40 at a side of the adjusting pipe 50 and an end surface 511 of the adjusting pipe 50 at a side of the valve member 40.

When the relief valve 3 is assembled, the stopper 70 is inserted into an inside of the first cylinder 32 in a state in which the stopper 70 is provided on the outer wall 421 of the valve member 40. The stopper 70 arranged in the first cylinder 32 together with the valve member 40 is moved toward the inner wall 311 while sliding on an inner wall 321, and then the stopper 70 is expanded toward the outer side in the radial direction by the biasing force of the stopper 70 itself, at the outer side groove 322. With this, the stopper 70 can be reciprocated in the outer side groove 322 while fitting with the inner side groove 423.

In the relief valve 3, the stopper 70 that regulates the movement of the valve member 40 in the valve opening direction by abutting on the valve housing 30 when the valve member 40 is moved in the valve opening direction is formed as a different component from the adjusting pipe 50. With this, even if the valve member 40 is moved in the valve opening direction when the relief valve 3 is opened, the stopper 70 and the inner wall 324 are in contact with each other, and then the contact between the valve member 40 and the adjusting pipe 50 can be prevented. Accordingly, the relief valve 3 has the effects (a) to (c) described in the first embodiment.

Fourth Embodiment

Figure 5:
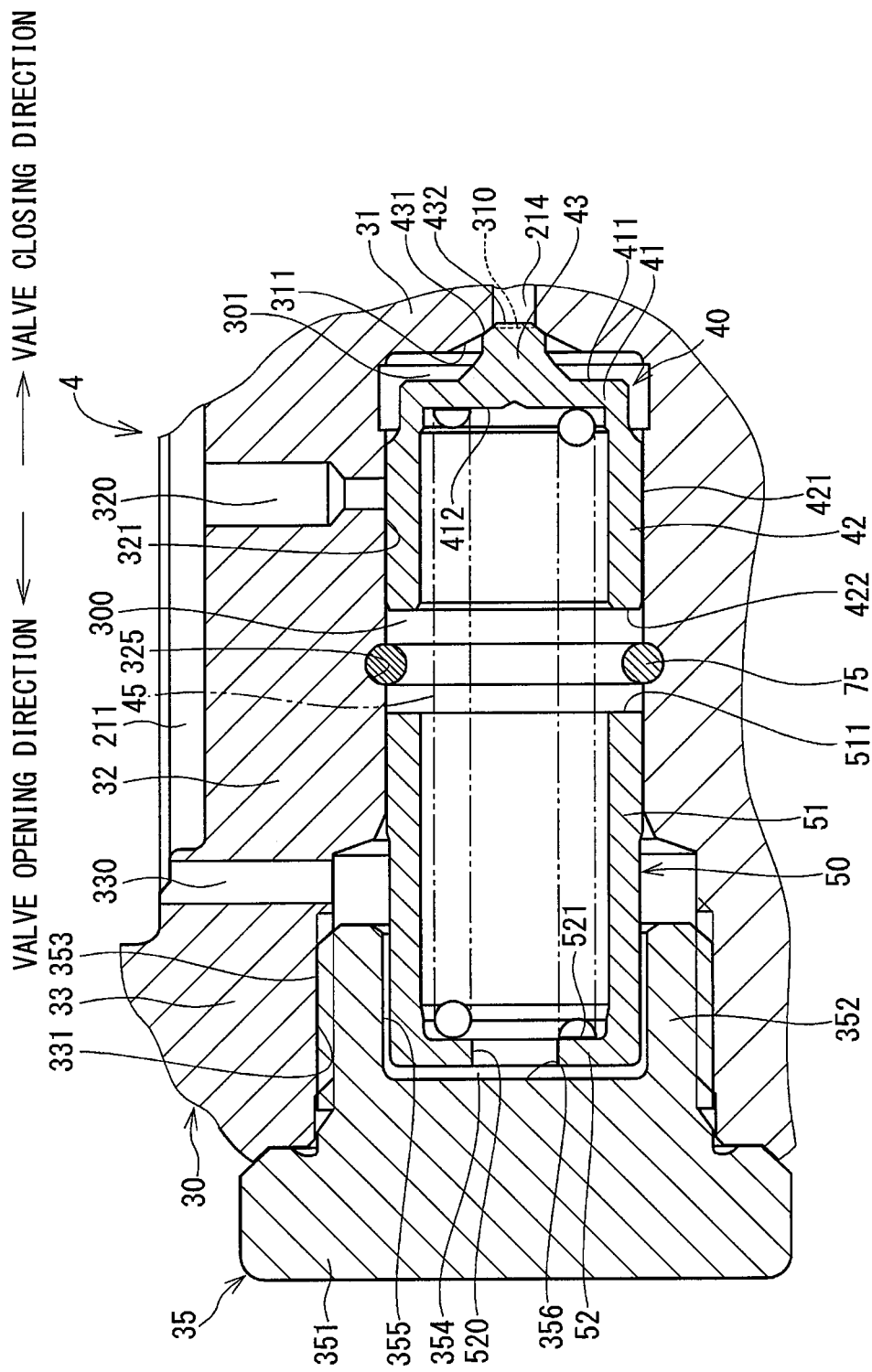
FIG. 5 is a cross-sectional view of a relief valve device according to a fourth embodiment of the present disclosure.

A relief valve device according to a fourth embodiment of the present disclosure is described with reference to FIG. 5. In the fourth embodiment, a regulating member is different from that in the first embodiment.

A relief valve 4 served as "a relief valve device" includes a valve housing 30 having a plug 35, a valve member 40, a spring 45, an adjusting pipe 50, a stopper 75 served as "a regulating member", and the like. In FIG. 5, a direction in which an inclined surface 431 of the valve member 40 is moved to be in contact with an inner wall 311 of the valve housing 30 is defined as "a valve closing direction", and a direction in which the inclined surface 431 is moved away from the inner wall 311 is defined as "a valve opening direction".

The stopper 75 is fixed to an inner wall 321 of a first cylinder 32. Specifically, the stopper 75 is fitted to a groove 325 formed on the inner wall 321 between the valve member 40 and the adjusting pipe 50. The stopper 75 is formed in a substantially C-shape and has biasing force to be expanded to an outer side in a radial direction.

When the relief valve 4 is assembled, the stopper 75 is inserted into an inside of the first cylinder 32 after the valve member 40 is inserted into the inside of the first cylinder 32. The stopper 70 arranged in the first cylinder 32 is moved toward the inner wall 311 while sliding on the inner wall 321, and then the stopper 70 is expanded toward the outer side in the radial direction by the biasing force of the stopper 70 itself, at the groove 325. With this, the stopper 75 is fitted to the groove 325, so that the stopper 75 is fixed to the first cylinder 32.

In the relief valve 4, the stopper 75 that regulates the movement of the valve member 40 in the valve opening direction by abutting on the valve member 40 when the valve member 40 is moved in the valve opening direction is formed as a different component from the adjusting pipe 50, and the stopper 75 is fixed to the valve housing 30. With this, the relief valve 4 has the effects (a) to (c) described in the first embodiment.

Fifth Embodiment

Figure 6:
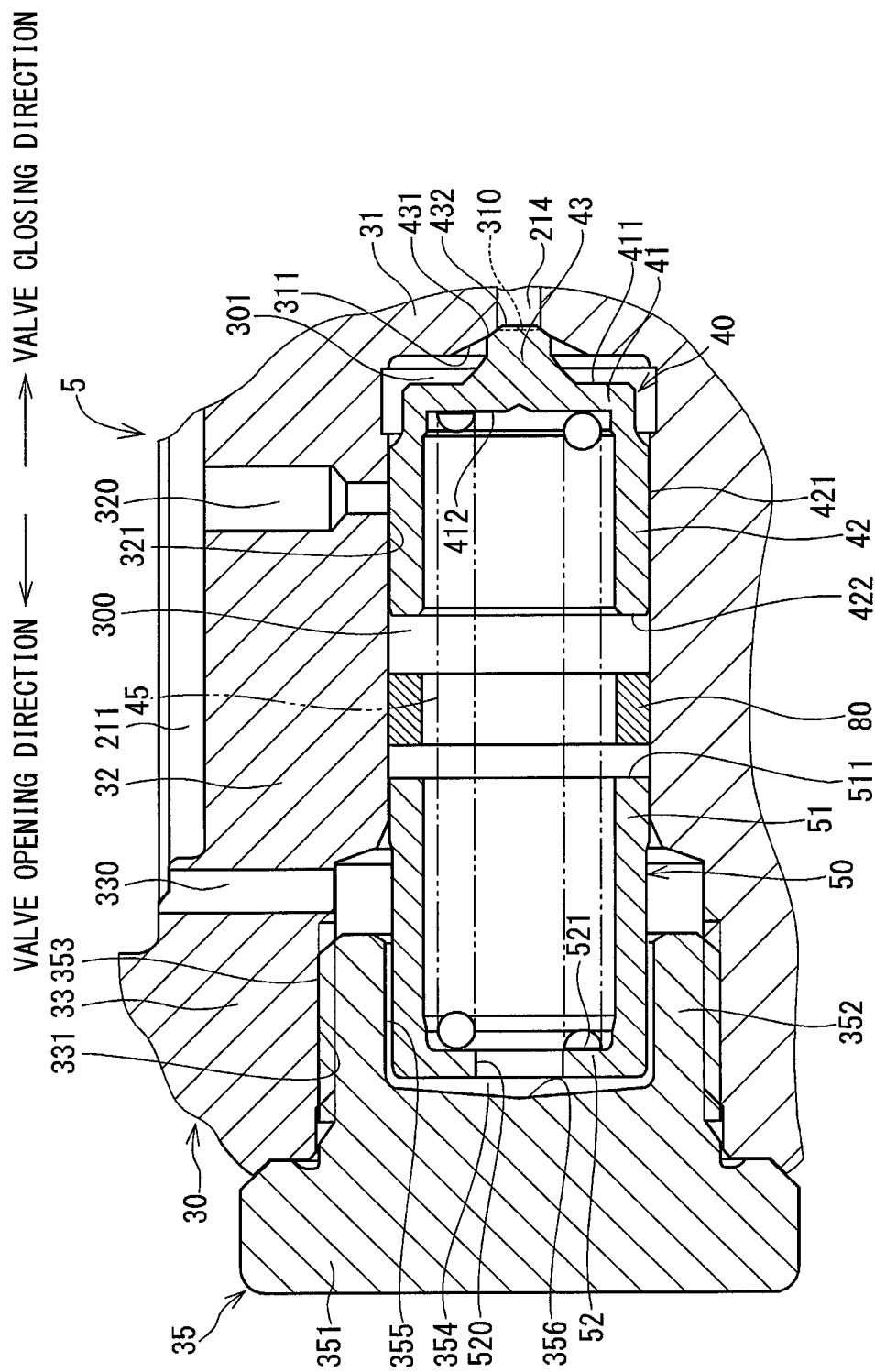
FIG. 6 is a cross-sectional view of a relief valve device according to a fifth embodiment of the present disclosure.

A relief valve device according to a fifth embodiment of the present disclosure is described with reference to FIG. 6. In the fifth embodiment, a regulating member is different from that in the first embodiment.

A relief valve 5 served as "a relief valve device" includes a valve housing 30 having a plug 35, a valve member 40, a spring 45, an adjusting pipe 50, a stopper 80 served as "a regulating member", and the like. In FIG. 6, a direction in which an inclined surface 431 of the valve member 40 is moved to be in contact with an inner wall 311 of the valve housing 30 is defined as "a valve closing direction", and a direction in which the inclined surface 431 is moved away from the inner wall 311 is defined as "a valve opening direction".

The stopper 80 is a substantially ring-shape member and is fixed to an inner wall 321 of a first cylinder 32. The stopper 80 is fixed to the inner wall 321 between the valve member 40 and the adjusting pipe 50 by means of, for example, fitting.

In the relief valve 5, the stopper 80 that regulates the movement of the valve member 40 in the valve opening direction by abutting on the valve member 40 when the valve member 40 is moved in the valve opening direction is formed as a different component from the adjusting pipe 50, and the stopper 80 is fixed to the valve housing 30. With this, the relief valve 5 has the effects (a) to (c) described in the first embodiment.

Sixth Embodiment

A relief valve device according to a sixth embodiment of the present disclosure is described with reference to FIG. 7. In the sixth embodiment, a regulating member is different from that in the first embodiment.

A relief valve 6 served as "a relief valve device" includes a valve housing 30 having a plug 35, a valve member 40, a spring 45, an adjusting pipe 50, a stopper 85 served as "a regulating member", and the like. In FIG. 7, a direction in which an inclined surface 431 of the valve member 40 is moved to be in contact with an inner wall 311 of the valve housing 30 is defined as "a valve closing direction", and a direction in which the inclined surface 431 is moved away from the inner wall 311 is defined as "a valve opening direction".

The stopper 85 is a substantially bar-shaped member and is provided on a first cylinder 32. The stopper 85 is inserted into a through hole 326 of the first cylinder 32. The through hole 326 is formed to fluidly connect a fuel chamber 211 and an inner space 300 with each other. An end 851 of the stopper 85, which is inserted into the through hole 326, at a side of the inner space 300 is protruded from an inner wall 321 toward the inner space 300 and housed in an inner side groove 424 formed on an outer wall 421 of a slide portion 42.

An inner wall 425 at a side opposite to the inner wall 311, among inner walls that forms the inner side groove 424, is arranged so as not to be in contact with an end surface 852 of the stopper 85 at a side opposite to the inner wall 311 when the inner wall 311 and the inclined surface 431 are in contact with each other. Further, an inner wall 426 at a side of the inner wall 311, among the inner walls forming the inner side groove 424, is arranged so as to form a gap between an end surface 422 of the valve member 40 and an end surface 511 of the adjusting pipe 50 when an end surface 853 of the stopper 85 at a side of the inner wall 311 and the inner wall 426 are in contact with each other.

Figure 7:
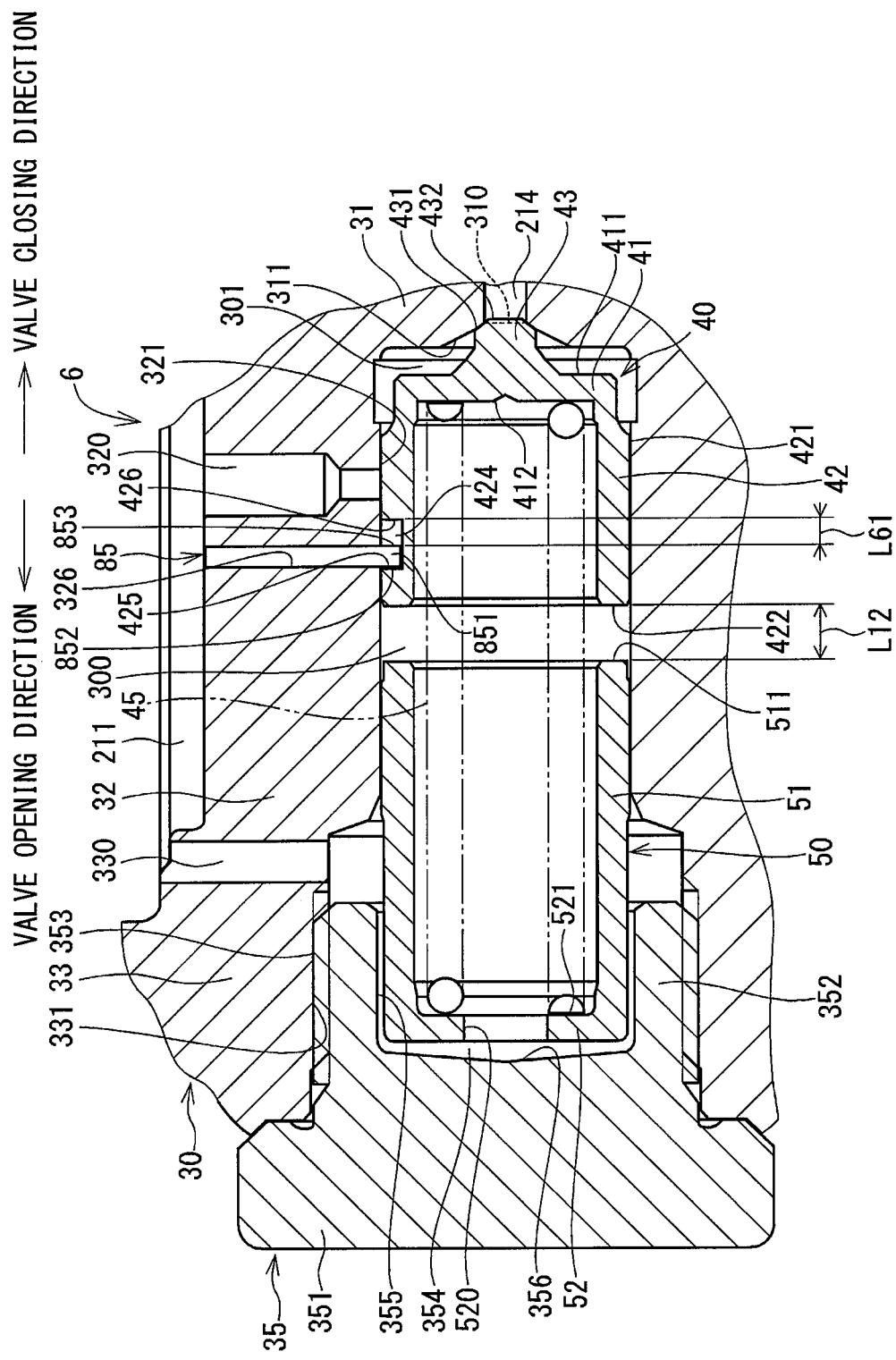
FIG. 7 is a cross-sectional view of a relief valve device according to a sixth embodiment of the present disclosure.

In the present embodiment, as shown in FIG. 7, when the inclined surface 431 of the seal 43 and the inner wall 311 of the valve seat portion 31 are in contact with each other, the end surface 852 of the stopper 85 and the inner wall 425 are in contact with each other. At this time, a distance L61 between the end surface 853 of the stopper 85 and the inner wall 426 of the inner side groove 424 is shorter than a distance L12 between the end surface 422 of the valve member 40 and the end surface 511 of the adjusting pipe 50.

When the relief valve 6 is assembled, the stopper 85 is inserted into the through hole 326 from a side of a fuel chamber 211 after the valve member 40 is inserted into an inside of the first cylinder 32. At this time, the end 851 of the stopper 85 inserted into the through hole 326 is protruded from the inner wall 321 so as to be arranged in the inner side groove 424.

In the relief valve 6, the stopper 85 that regulates the movement of the valve member 40 in the valve opening direction by abutting on the valve member 40 when the valve member 40 is moved in the valve opening direction is formed as a different component from the adjusting pipe 50. With this, even if the valve member 40 is moved in the valve opening direction when the relief valve 6 is opened, the stopper 85 and the inner wall 426 are in contact with each other, and then the contact between the valve member 40 and the adjusting pipe 50 can be prevented. Accordingly, the relief valve 6 has the effects (a) to (c) described in the first embodiment.

Seventh Embodiment

A relief valve device according to a seventh embodiment of the present disclosure is described with reference to FIG. 8. In the seventh embodiment, a regulating member is different from that in the first embodiment.

A relief valve 7 served as "a relief valve device" includes a valve housing 30 having a plug 35, a valve member 40, a spring 45, an adjusting pipe 50, a stopper 90 served as "a regulating member" and the like. In FIG. 8, a direction in which an inclined surface 431 of the valve member 40 is moved to be in contact with an inner wall 311 of the valve housing 30 is defined as "a valve closing direction", and a direction in which the inclined surface 431 is moved away from the inner wall 311 is defined as "a valve opening direction".

The stopper 90 is a bar-shaped member and is provided on a slide portion 42. The stopper 90 is inserted into a through hole 427 of the slide portion 42. The through hole 427 is formed to fluidly connect an inside and an outside of the slide portion 42 with each other. An end 901 of the stopper 90 is protruded from an outer wall 421 toward an outer side in a radial direction so as to be arranged in an outer side groove 327 formed on an inner wall 321 of a first cylinder 32.

An inner wall 328 at a side of the inner wall 311, among inner walls that forms the outer side groove 327, is arranged so as not to be in contact with an end surface 902 of the stopper 90 at a side of the inner wall 311 when the inner wall 311 and the inclined surface 431 are in contact with each other. Further, an inner wall 329 at a side opposite to the inner wall 311, among the inner walls that forms the outer side groove 327, is arranged so as to form a gap between an end surface 422 of the valve member 40 and an end surface 511 of the adjusting pipe 50 when an end surface 903 of the stopper 90 at a side opposite to the inner wall 311 and the inner wall 329 are in contact with each other.

Figure 8:
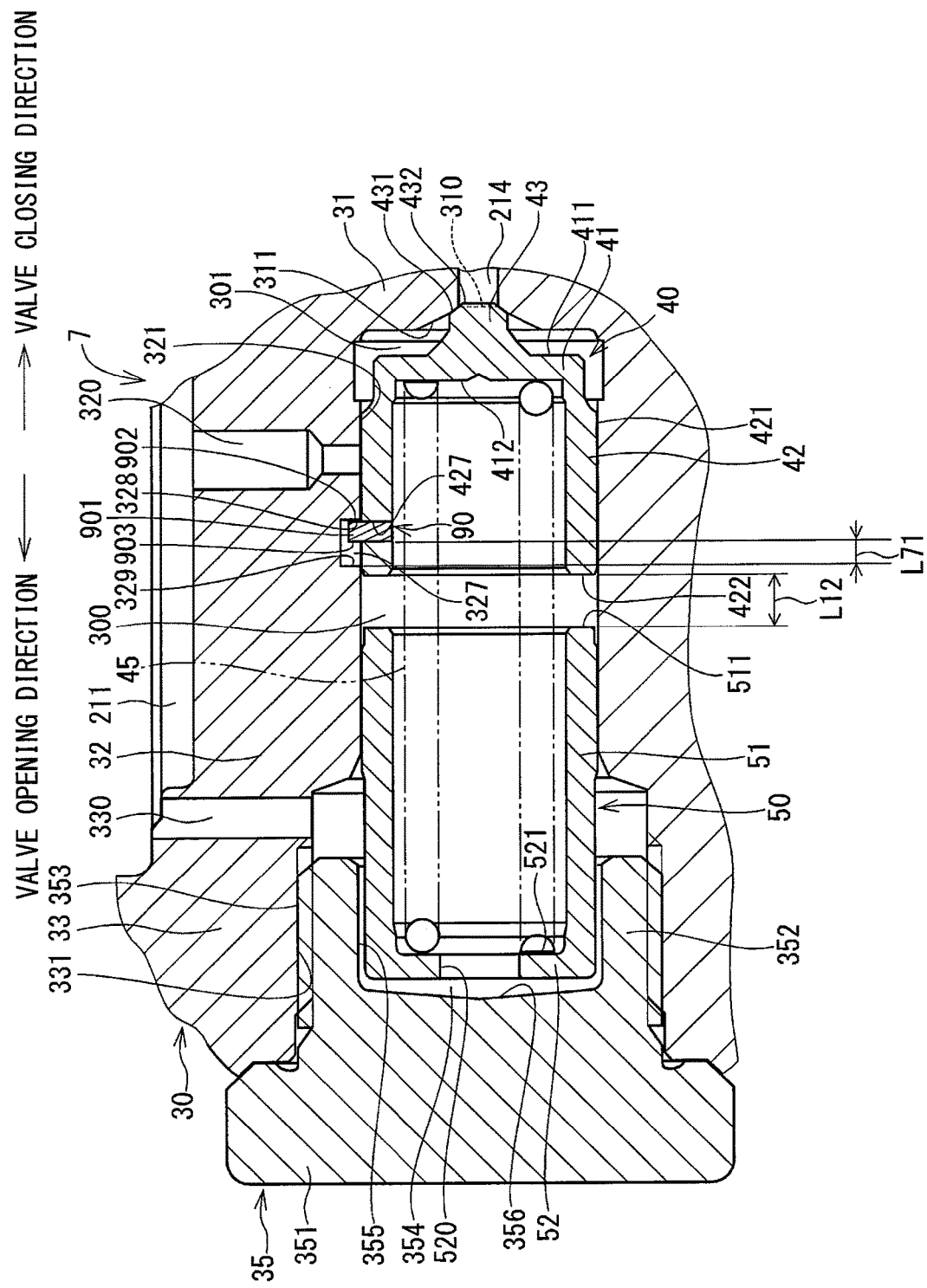
FIG. 8 is a cross-sectional view of a relief valve device according to a seventh embodiment of the present disclosure.

In the present embodiment, as shown in FIG. 8, when the inclined surface 431 of the seal 43 and the inner wall 311 of the valve seat portion 31 are in contact with each other, the end surface 902 of the stopper 90 and the inner wall 328 are in contact with each other. At this time, a distance L71 between the end surface 903 of the stopper 90 and the inner wall 329 of the outer side groove 327 is shorter than a distance L12 between the end surface 422 of the valve member 40 and the end surface 511 of the adjusting pipe 50.

When the relief valve 7 is assembled, the stopper 90 is inserted into the through hole 427 before the valve member 40 is inserted into an inside of the first cylinder 32. At this time, the end 901 is arranged so as not to be protruded from the outer wall 421. After the valve member 40 is inserted into the inside of the first cylinder 32, the stopper 90 is extruded from an inside of the slide portion 42 toward an outer side in a radial direction so that the end 901 is protruded to be positioned in the outer side groove 327.

In the relief valve 7, the stopper 90 that regulates the movement of the valve member 40 in the valve opening direction by abutting on the valve housing 30 when the valve member 40 is moved in the valve opening direction is formed as a different component from the adjusting pipe 50. With this, even if the valve member 40 is moved in the valve opening direction when the relief valve 7 is opened, the stopper 90 and the inner wall 329 are brought into contact with each other, and then the contact between the valve member 40 and the adjusting pipe 50 can be prevented. Accordingly, the relief valve 7 has the effects (a) to (c) described in the first embodiment.

Eighth Embodiment

Figure 9:
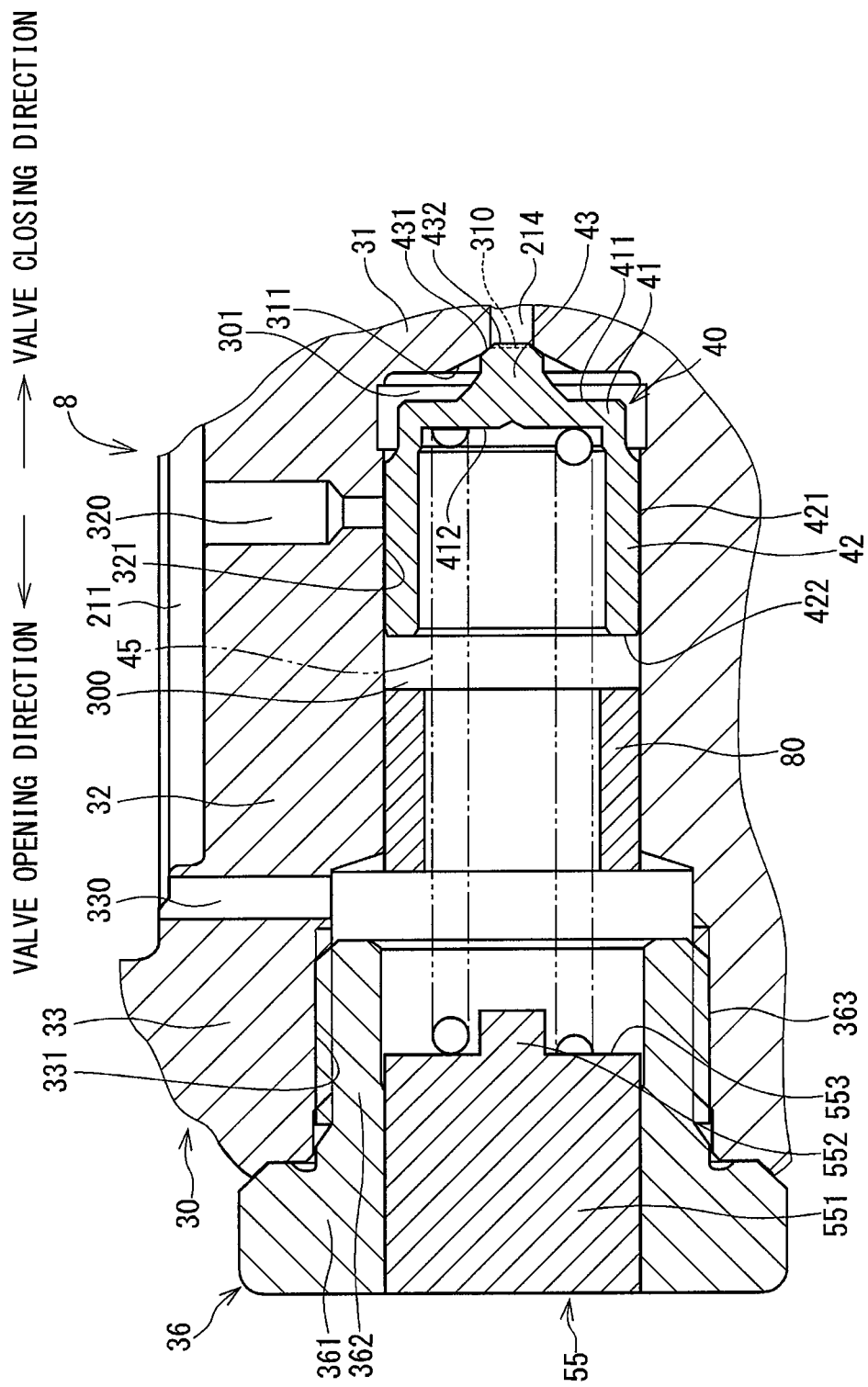
FIG. 9 is a cross-sectional view of a relief valve device according to an eighth embodiment of the present disclosure.

A relief valve device according to an eighth embodiment of the present disclosure is described with reference to FIG. 9. In the eighth embodiment, a biasing-force-adjusting member is different from that in the fifth embodiment.

A relief valve 8 served as "a relief valve device" includes a valve housing 30, a valve member 40, a spring 45, a biasing-force-adjusting member 55, a stopper 80, and the like. In FIG. 9, a direction in which an inclined surface 431 of the valve member 40 is moved to be in contact with an inner wall 311 of the valve housing 30 is defined as "a valve closing direction", and a direction in which the inclined surface 431 is moved away from the inner wall 311 is defined as "a valve opening direction".

The valve housing 30 is formed by a valve seat portion 31, a first cylinder 32, a second cylinder 33, a plug 36 served as "a second valve body", and the like.

The plug 36 is provided in an opening of the second cylinder 33 at a side opposite to the first cylinder 32. The plug 36 is formed in a substantially cylindrical shape. The plug 36 includes a large outer diameter portion 361, a small outer diameter portion 362, and the like. The large outer diameter portion 361 and the small outer diameter portion 362 are formed integrally.

The large outer diameter portion 361 is formed in a substantially cylindrical shape. The large outer diameter portion 361 is formed such that an outer diameter of the large outer diameter portion 361 is larger than an inner diameter of the opening of the second cylinder 33 at a side opposite to the first cylinder 32.

The small outer diameter portion 362 is formed in a substantially cylindrical shape and is provided at a side of the valve seat portion 31 with respect to the large outer diameter portion 361. The small outer diameter portion 362 is formed such that an outer diameter of the small outer diameter portion is substantially equal to an inner diameter of the second cylinder 33. Further, the small outer diameter portion 362 is formed such that an inner diameter of the small outer diameter portion is substantially equal to an inner diameter of the large outer diameter portion 361. A screw groove is formed on an outer wall 363 of the small outer diameter portion 362. The screw groove can engage with a screw groove formed on the inner wall 331 of the second cylinder 33. With this, the plug 36 is joined to the second cylinder 33 by the screw.

The biasing-force-adjusting member 55 is formed as a substantially cylindrical member and is fixed to the plug 36 at an inside of the plug 36. In the present embodiment, the biasing-force-adjusting member 55 is welded to the plug 36. The biasing-force-adjusting member 55 is formed by a fixing portion 551, a projection 552, and the like. The fixing portion 551 and the projection 552 are formed integrally.

The fixing portion 551 is formed in a substantially cylindrical shape such that an outer diameter of the fixing portion is substantially equal to an inner diameter of the plug 36. The fixing portion 551 is provided to close an opening of the large outer diameter portion 361. The other end of the spring 45 is in contact with an end surface 553 of the fixing portion 551 at a side of the valve seat portion 31.

The projection 552 is formed to protrude from the end surface 553 toward the valve seat portion 31. The projection 552 is provided at an inside of the spring 45 so as to regulate the other end of the spring 45 to move in a radial direction.

In the relief valve 8, the stopper 80 is formed as a different component from the biasing-force-adjusting member 55, and the stopper 80 is fixed to the valve housing 30. With this, the relief valve 8 has the effects (a) to (c) described in the first embodiment.

Further, in the relief valve 8, the biasing-force-adjusting member 55 is joined to the valve housing 30 via the plug 36 by the screw. With this, a position of the biasing-force-adjusting member 55 against the valve housing 30 can be adjusted. Accordingly, the relief valve 8 can adjust the biasing force of the spring 45 precisely.

Ninth Embodiment

Figure 10:
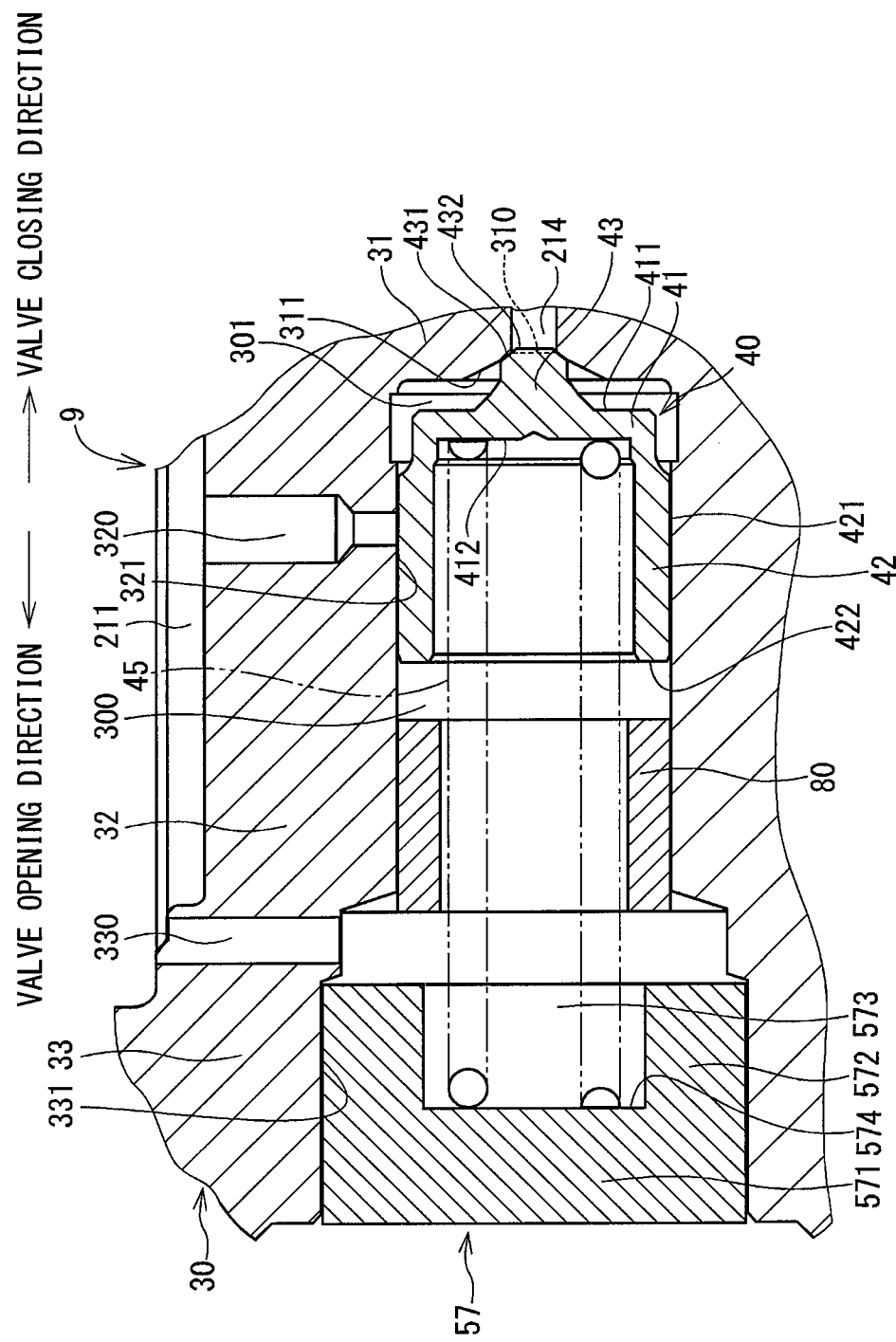
FIG. 10 is a cross-sectional view of a relief valve device according to a ninth embodiment of the present disclosure.

A relief valve device according to a ninth embodiment of the present disclosure is described with reference to FIG. 10. In the ninth embodiment, a biasing-force-adjusting member and a plug are different from those in the fifth embodiment.

A relief valve 9 served as "a relief valve device" includes a valve housing 30, a valve member 40, a spring 45, a biasing-force-adjusting member 57, a stopper 80 and the like. In FIG. 10, a direction in which an inclined surface 431 of the valve member 40 is moved to be in contact with an inner wall 311 of the valve housing 30 is defined as "a valve closing direction", and a direction in which the inclined surface 431 is moved away from the inner wall 311 is defined as "a valve opening direction".

The valve housing 30 is formed by a valve seat portion 31, a first cylinder 32, a second cylinder 33, and the like. That is, unlike the valve housings of the relief valves according to other embodiments, the valve housing 30 of the relief valve 9 according to the ninth embodiment does not include a plug provided in the opening of the second cylinder 33 at the side opposite to the first cylinder 32.

The biasing-force-adjusting member 57 is formed as a substantially cylindrical member and is fixed to the second cylinder 33 at an inside of the second cylinder 33. In the present embodiment, the biasing-force-adjusting member 55 is welded to the second cylinder 33. The biasing-force-adjusting member 57 forms an inner space 300 together with the valve seat portion 31, the first cylinder 32, and the second cylinder 33. The biasing-force-adjusting member 57 includes a body 571, a cylinder 572, and the like. The body 571 and the cylinder 572 are formed integrally.

The body 571 is formed in a substantially circular plate shape. The body 571 is provided to close an opening of the second cylinder 33 at a side opposite to the first cylinder 32.

The cylinder 572 is formed in a substantially cylindrical shape and is provided at a side of the valve seat portion 31 with respect to the body 571. An outer diameter of the cylinder 572 is the same as an inner diameter of the second cylinder 33.

The biasing-force-adjusting member 57 includes a spring insertion space 573 into which a part of the spring 45 can be inserted. The other end of the spring 45 is in contact with a bottom surface 574 of the biasing-force-adjusting member 57 that forms the spring insertion space 573.

In the relief valve 9, the stopper 80 is formed as a different component from the biasing-force-adjusting member 55, and the stopper 80 is fixed to the valve housing 30. With this, the relief valve 9 has the effects (a) to (c) described in the first embodiment.

Other Embodiments

In each of the embodiments described above, the relief valve is applied to the high-pressure pump that supplies high-pressure fuel to the internal combustion engine. However, a device to which the relief valve is applied is not limited to this. The relief valve may be configured to transfer fluid in a first space having relatively high pressure to a second space, which is different from the first space, in accordance with the pressure of the fluid so that the pressure of the fluid in the first space can be reduced.

In each of the embodiments described above, the valve member is biased in the valve closing direction by the spring. However, the biasing member that biases the valve member in the valve closing direction may not be formed as a spring.

In each of the embodiments described above, each of the valve member and the adjusting pipe is formed in a cylindrical shape having a bottom. However, the shape of each of the valve member and the adjusting pipe is not limited to this.

In the first embodiment, the rod portion of the stopper is formed such that the outer diameter is smaller than the outer diameter of the fixing portion of the stopper. However, a relation of the size between the rod portion and the fixing portion is not limited to this. The outer diameter of the rod portion may be formed as same as the outer diameter of the fixing portion.

In each of the embodiments described above, the valve seat portion served as "a valve seat member" having the communication hole and "the valve seat", the first cylinder served as "a valve body" forming the inner space and the like are formed integrally. However, the valve seat member and the valve body are formed as respective components.

As described above, the present disclosure is not limited to such embodiments, and therefore the present disclosure can be carried out by various configurations within a subject matter of the present disclosure.

The invention claimed is:

1. A relief valve device connected to a first space and a second space that is a different space from the first space, the relief valve device configured to reduce pressure of fluid in the first space, the relief valve device comprising:
   a valve body having a first valve body formed in a cylindrical shape and a second valve body provided to close an opening of the first body so as to define an inner space;
   a valve seat member having a communication hole fluidly connecting the inner space and the first space, and a valve seat formed around the communication hole at a side of the inner space;
   a valve member configured to reciprocate against the valve seat member, the valve member regulating a flow of the fluid between the first space and the second space when the valve member is in contact with the valve seat and allowing the flow of the fluid between the first space and the second space when the valve member is separated from the valve seat;
   a biasing member configured to bias the valve member such that the valve member and the valve seat are in contact with each other;
   a biasing-force-adjusting member connected to the first valve body at an end opposite to the valve seat with respect to the valve member, the biasing-force-adjusting member configured to adjust a biasing force of the biasing member based on a position of the biasing-force-adjusting member; and
   a regulating member formed as a different component from the biasing-force-adjusting member and connected to the second valve body, the regulating member regulating a movement of the valve member in a valve opening direction by abutting on the valve member or the valve body when the valve member is moved in the valve opening direction that is a direction away from the valve seat, wherein
   the regulating member includes a body side fixing portion fixed to the second valve body, and a body side contact portion formed to extend from the body side fixing portion toward the valve member,
   the body side fixing portion and the body side contact portion are integrally formed,
   the biasing-force-adjusting member is in a bottomed cylindrical shape and includes a cylinder and a bottom having a through hole,
   the body side contact portion of the regulating member includes an end on a side of the valve seat,
   an outer diameter of the end is smaller than an outer diameter of the through hole of the bottom,
   the end is inserted in the through hole of the bottom, and the end is contactable with the valve member.

2. The relief valve device according to claim 1, wherein the regulating member is contactable with the valve member.

3. A pump, comprising:
   a housing including a pressurizing chamber that suctions and pressurizes a fluid, a suction passage from which the fluid suctioned into the pressurizing chamber flows, and a discharge passage to which the fluid pressurized in the pressurizing chamber and discharged flows;
   the relief valve device according to claim 1;
   a suction valve provided between the suction passage and the pressurizing chamber, and configured to adjust an amount of the fluid to be pressurized in the pressurizing chamber; and
   a discharge valve provided between the pressurizing chamber and the discharge passage, and configured to discharge the fluid pressurized in the pressurizing chamber to an outside,
   wherein the first space is formed by the discharge passage or formed to communicate with the discharge passage.

4. The relief valve device according to claim 1, wherein the biasing-force-adjusting member has an end surface that is on a side of the valve member and is a flat surface connecting a radially inner periphery of the biasing-force-adjusting member with a radially outer periphery of the biasing-force-adjusting member, and when the valve member and the valve seat are in contact with each other, a distance between the end of the regulating member and a surface of the valve member on a side of the end of the regulating member is shorter than a distance between an end surface of the valve member on a side of the biasing-force-adjusting member and the end surface of the biasing-force-adjusting member on the side of the valve member.

5. The relief valve device according to claim 4, wherein when the end of the regulating member is in contact with the valve member, the valve member and the biasing-force-adjusting member are not in contact with each other.

6. The relief valve device according to claim 1, wherein the biasing member includes a spring.

* * * * *